(12) United States Patent
Kazyaka

(10) Patent No.: US 7,731,144 B2
(45) Date of Patent: Jun. 8, 2010

(54) BEVERAGE CONTAINER HOLDER AND BASKET

(76) Inventor: Stephen R. Kazyaka, 48 Big Trail, Sherman, CT (US) 06784

( * ) Notice: Subject to any disclaimer, the term of this patent is extended or adjusted under 35 U.S.C. 154(b) by 1064 days.

(21) Appl. No.: 11/296,418

(22) Filed: Dec. 8, 2005

(65) Prior Publication Data

US 2006/0081750 A1    Apr. 20, 2006

Related U.S. Application Data

(63) Continuation-in-part of application No. 11/205,044, filed on Aug. 17, 2005, now abandoned, which is a continuation-in-part of application No. 10/811,594, filed on Mar. 29, 2004, now abandoned.

(51) Int. Cl.
*A47K 1/09* (2006.01)

(52) U.S. Cl. .............. 248/311.2; 248/346.11

(58) Field of Classification Search .............. 248/309.1, 248/311.2, 311.3, 312.1, 314, 346.1
See application file for complete search history.

(56) References Cited

U.S. PATENT DOCUMENTS

| | | | |
|---|---|---|---|
| 2,329,512 A | 9/1943 | Clifford | |
| 3,096,960 A * | 7/1963 | Kinney | 248/113 |
| 3,842,981 A | 10/1974 | Lambert | |
| 4,508,303 A | 4/1985 | Beckerer, Jr. | |
| 4,832,095 A * | 5/1989 | Bonnell | 141/106 |
| 5,071,096 A * | 12/1991 | Hartmann et al. | 248/154 |
| 5,326,064 A | 7/1994 | Sapien | |
| 5,628,441 A | 5/1997 | Dykstra | |
| 5,823,410 A | 10/1998 | Ackeret | |
| 5,839,598 A * | 11/1998 | Mitchell | 220/321 |
| 5,860,630 A | 1/1999 | Wildey et al. | |
| 5,887,709 A | 3/1999 | Thompson | |
| 5,984,156 A | 11/1999 | Bridges | |
| 6,089,519 A * | 7/2000 | Laybourne | 248/346.11 |
| 6,367,652 B1 | 4/2002 | Toida et al. | |
| 6,502,711 B1 * | 1/2003 | Mc Rae | 220/23.4 |
| 6,502,715 B2 | 1/2003 | Miorelli | |

* cited by examiner

*Primary Examiner*—Amy J Sterling
*Assistant Examiner*—Steven M Marsh
(74) *Attorney, Agent, or Firm*—Richard C. Litman

(57) ABSTRACT

A beverage cup holder to contain drinking fluids, collect condensation and spilled fluids, and direct them to a self contained reservoir. The holder has an upper rim that is taller than the container being held, ribs to support the entire height of the held container utilizing an upper funnel, and a device which stores spilled fluids and condensation within a self contained reservoir for spilled fluids formed by the holder from a centered vertical support column as well as creating an area to add attachments including weights, a magnet, or lighting to its open bottom end.

19 Claims, 17 Drawing Sheets

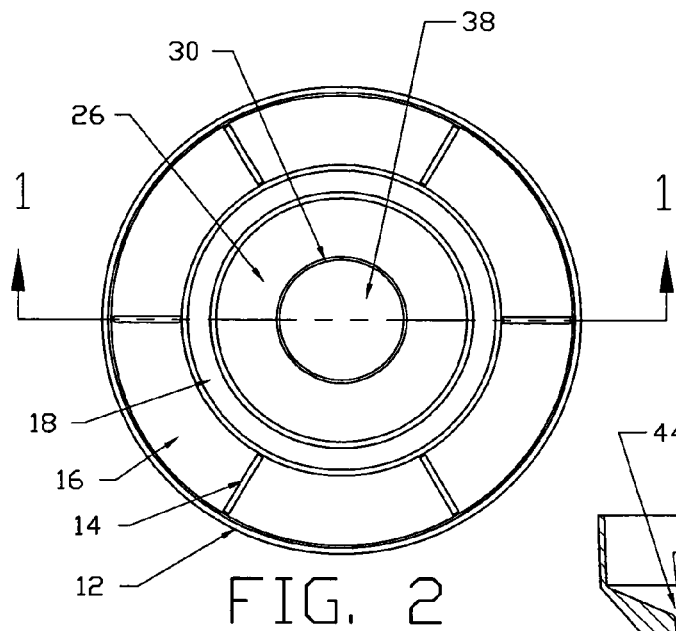
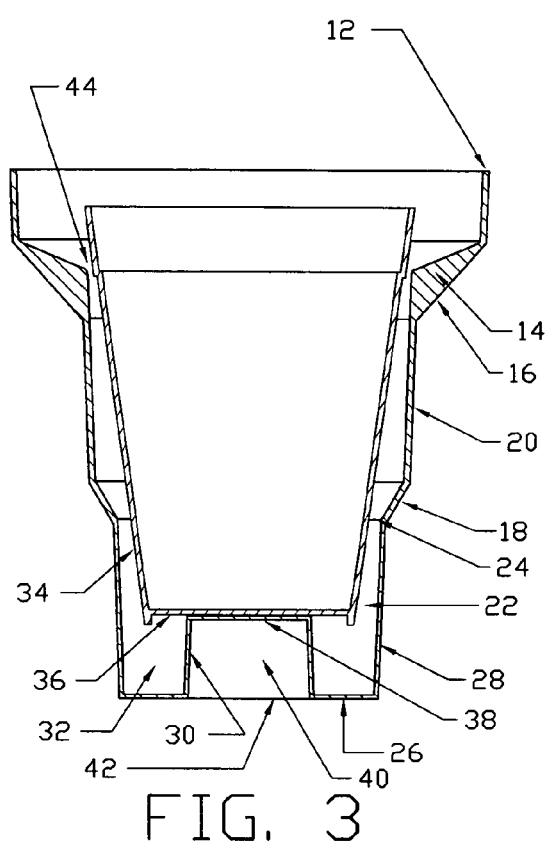
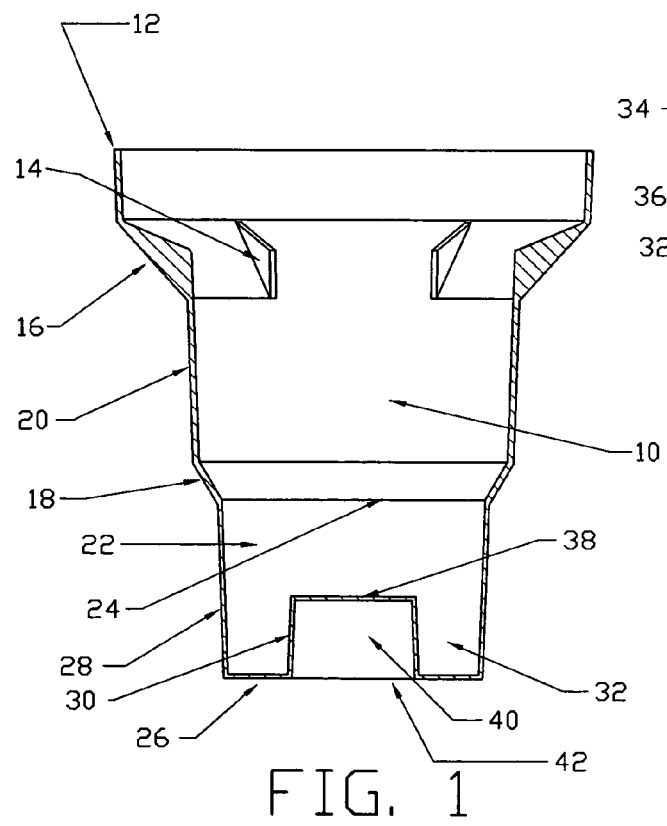

BEVERAGE CONTAINER HOLDER AND BASKET

CROSS REFERENCES TO RELATED APPLICATIONS

This is a continuation-in-part of my prior application Ser. No. 11/205,044 filed Aug. 17, 2005, now abandoned which is a continuation-in-part of application Ser. No. 10/811,594, filed Mar. 29, 2004 now abandoned.

BACKGROUND OF THE INVENTION

1. Field of the Invention

The present invention relates to beverage cup containers or holders. In particular, the invention relates to both portable and fixed holders beverage cups, which holders are adapted to collect spillage and any condensation from the beverage cup.

2. Description of the Related Art

The need for an improved cup holder has been magnified by the recent increase in the average number of cup holders per vehicle, golf cart, shopping cart, movie theater chair, wheelchair, etc. Current cup holders do not provide a means for effectively capturing spilled fluids or condensation from beverage cups and storing these fluids apart for disposal at a later time. The most widely known cup holders are those found in vehicle dashboards or consoles; but they do not have a separate area that contains the spills or condensation once they are created. This typically leaves the container sitting in the fluids, or fluids being trapped between the cup and the container and spilling onto the dash, console or driver. The art would certainly welcome a cup holder that would alleviate the above discussed problems.

Pertinent examples of related art cup holders are cited and identified in the accompanying IDS. However, none of the cited and identified relative art, taken either singly or in combination, is seen to disclose a holder for beverage cups as will subsequently be described and claimed in the the instant invention.

SUMMARY OF THE INVENTION

The present invention is drawn to a beverage cup or container holder that is adapted to capture and retain therein any spills or condensation from the cup or container. Several embodiments of the invention are presented herein. In the preferred embodiment, the holder is provided with a centered vertical upright column that supports the cup or container and allows the captured fluids to be stored around the base of the column out of contact with the cup or container. Another embodiment eliminates the vertical column and incorporates a removable basket, which basket is adapted to receive the cup or container therein. Another embodiment provides for an adjustable platform mounted to the vertical column. Still another embodiment includes attached plural holders.

Accordingly, the instant invention presents a durable beverage container holder that is easy to use and functions to eliminate spills and condensate accidents. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

FIG. 1 is a cross-sectional view taken along lines 1-1 of FIG. 2.

FIG. 2 is a plan view looking at the top of the holder.

FIG. 3 is a cross sectional view taken along lines 1-1 of FIG. 2 and shown with a container held in position.

Similar reference characters denote corresponding features consistently throughout the attached drawings.

DETAILED DESCRIPTION OF THE PREFERRED EMBODIMENTS

Figure 4:
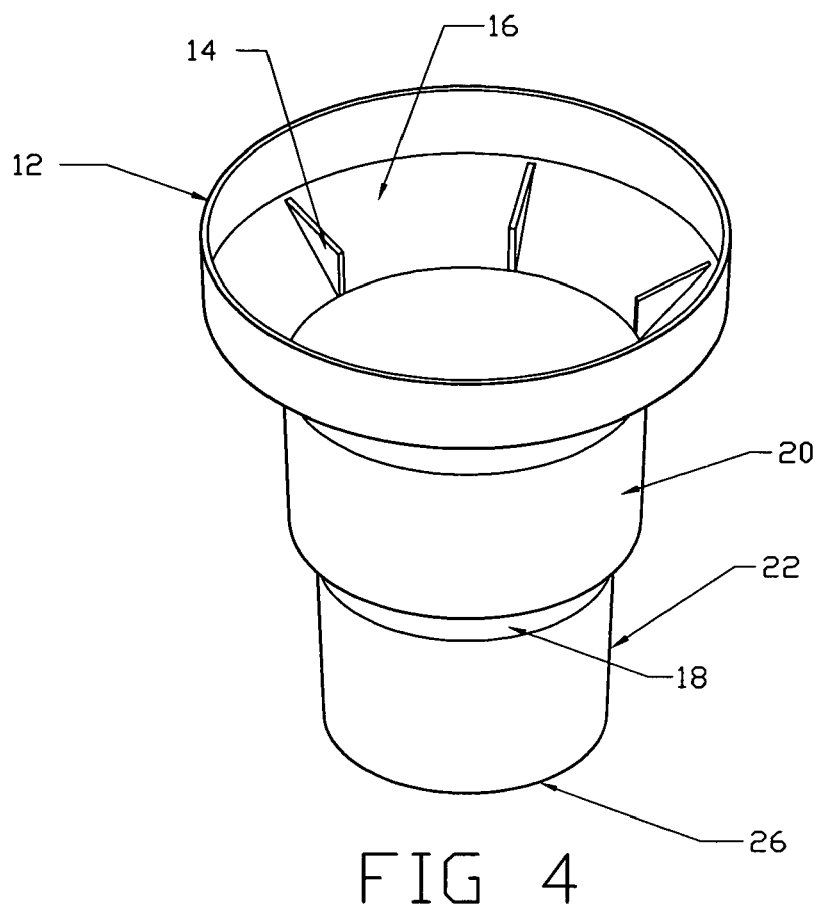
FIG. 4 is a perspective view from a top side advantage.
Figure 5:
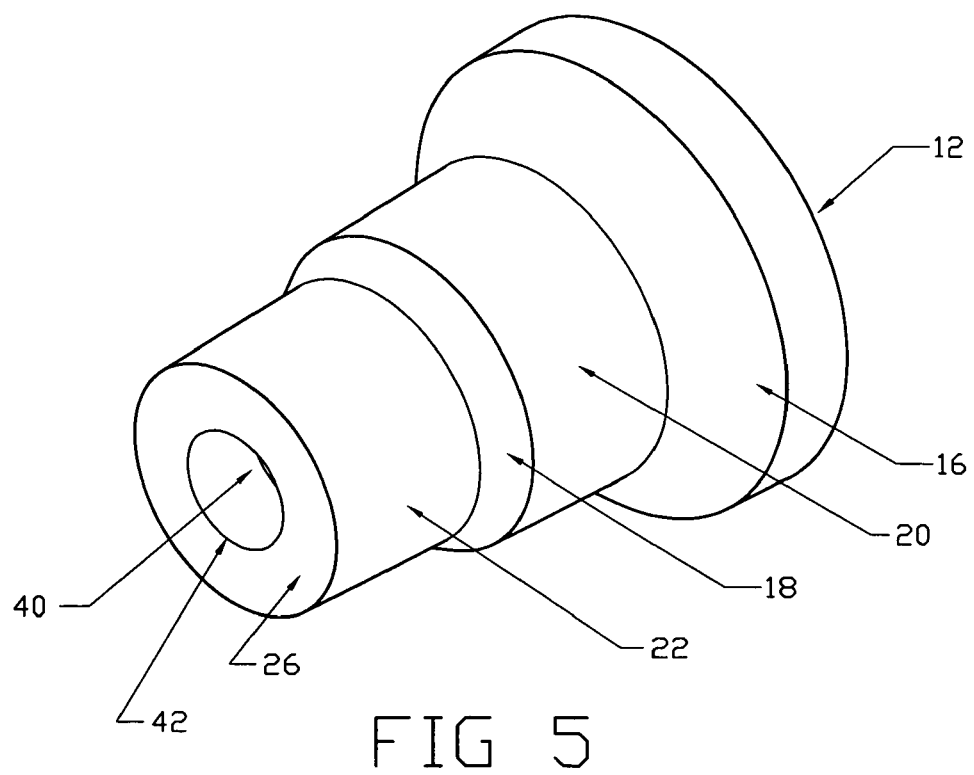
FIG. 5 is a perspective view of the holder from a bottom side advantage.

The invention comprises a holder for containing a beverage cup. The holder is a generally cylindrical container having preferably three or four progressively narrower sections although the holder may contain one, two or five sections. The selection of a three or four section cup holder is determined by the size of the beverage cup to be contained. The novel features of the invention described herein apply to both three and four section cup holders. The cup holder includes a first open-top section, a narrower second middle section and a narrower third or fourth closed bottom section, wherein the rim of the top section is wider and higher than the rim of the cup contained in the holder. The holder includes a means for supporting the bottom of the beverage cup above the bottom of the holder. In one embodiment, a centered portion of the bottom of the third or fourth section is elevated to form a vertical support column for the beverage cup bottom, a reservoir for spilled fluids and a recessed open pocket corresponding to the wall of the raised column.

Other means for supporting the bottom of the beverage cup in the holder while maintaining a reservoir for spilled fluids include at least one vertical wall partitioning rib members in the bottom of the third or fourth bottom section. Another means for supporting the bottom of the beverage cup in the holder while maintaining a reservoir for spilled fluids includes forming multiple indents around the interior circumference of the third or fourth bottom section. Yet another means for supporting the bottom of the beverage cup in the holder while maintaining a reservoir for spilled fluids includes multiple short, vertical studs connected to the bottom of the third or fourth bottom section.

The cup holder also includes a means for laterally supporting the beverage cup arrayed about the interior wall of the first section of the cup holder. The cup support means may comprise ribs arrayed about the interior wall of the first section of the cup holder. The ribs preferably comprise at least three vertical, narrow, flat, horizontally opposed ribs circumferentially disposed about the interior wall of the first section.

Preferably, the reservoir of the cup holder includes a circular self-contained reservoir formed of the column interior wall, the third or fourth bottom section interior wall and a portion of the interior bottom wall.

The holder of the invention contains means for connecting fixtures to the recessed pocket formed within the column of the cup holder contained in the third or fourth bottom section. A preferred means includes a metal or wood post or pipe such as PVC pipe or coupling having one end connected to the cup holder within the recessed pocket. The pipe may be connected by press fitting, adhesives, threads or any means known in the art. A single post appropriately connected to the cup holder exterior pocket can serve as a single garden stand for the cup holder. Using the appropriate pipefitting elbows, tees, nipples and couplings, a single post can serve a variety of applications such as a stand for two or more cup holders. In another embodiment, a pipe nipple can be connected into the recessed pocket of the cup holder and then connected to a clamp to convert the cup holder to a secure, readily portable cup holder.

In another embodiment of the invention, a flip lid is affixed to the cup holder first section. Although the cup holder is largely self-protected from fluid spills, the flip lid protects the liquid beverage from outside adulteration, including rain, and protects the user from splashing. The lid is connected to the cup holder rim, preferably by a snap spring-loaded hinge. The primary function of the flip lid is to deflect spills from splashing during movement of the vehicle down the street.

In yet another embodiment, the cup holder is manufactured in two sections by dividing the holder laterally through different sections and forming the divided wall of the second section into complementary male and female parts. The sections are joined by connecting portions of the different sections together, allowing the container to be adjusted to hold smaller and larger cups properly. By disassembling the cup holder, cleaning of the holder is made especially easy and the portability of the apparatus is enhanced.

Referring to the figures, in one embodiment of the invention (FIG. 1) there is provided three section holder 10 that holds a drinking container. The holder is portable and machine washable and comprises of upper rim 12 taller than the container being held, several support ribs 14 arrayed about its upper funnel 16 and connected to the lower funnel 18 by means of a generally cylindrical wall 20. The lower section 22 has an open first end 24 and an opposite second end 26 and is formed by means of a generally cylindrical wall 28. Contained within the lower section 22 rising from the bottom end 26 of the holder 10 is a centered vertical support column 30 standing approximately 1 inch tall thus creating the self contained reservoir 32 about its base.

As seen in FIG. 3 there is a held beverage container 34 that is placed in a holder 10 resting its lower end 36 on the centered vertical support column 30 as its upper end 44 comes to rest upon the support rib 14 restraining the held container 34 from any movements while still allowing fluids to pass to the said holder's 10 self contained reservoir 32 which stores spilled fluids and condensation for later easy disposal.

To accomplish an important function of the invention there is shown in FIG. 3 the upper rim 12 describing generally a cylindrical surface that extends above the held container 34. Below this, in accordance with an important feature of this invention is the upper funnel 16 in combination with the support ribs 14 which provide support to the full height of the container while also providing passage to condensation and spilled fluids from the held container 34 to the self contained reservoir 32 in the base of the lower section 22.

Upon further inspection of FIG. 1 it will be seen that the upper rim 12 has an open end with a diameter of approximately 5.4 inches leading down to the upper funnel 16 with a top diameter of approximately 5.1 inches and a bottom diameter of approximately 3.6 inches. The upper funnel 16 contains several support ribs 14 arrayed evenly around the entire circumference of the said upper funnel 16. This allows better access to the held container while allowing fluids to pass. These support ribs are approximately 0.125 inch's thick extending out from the upper funnel, thus providing support to the held container 34 while also allowing fluids to readily move to the lower section 22 and collect in the holder's 10 self contained reservoir 32 separate from the held container 34.

In a preferred embodiment the fluids traveling inside the apparatus cylindrical inner surface 20, which has a diameter of approximately 3.5 inches, directs fluids to the bottom funnel comprising of an upper open end with a diameter of approximately 3.5 inches and a lower open end with a diameter of approximately 3 inches leading to what will be considered the lower section 22. The lower section 22 comprises a generally cylindrical surface approximately 2 inches in height and 3 inches in diameter houses a vertical support column 30 extending upwardly from the bottom end 26 of the holder 10 standing approximately 1 inch tall and approximately 1.4 inches in diameter thus creating a platform 38 to support a held container 34 and creating a reservoir 32 about its base, while further creating a open hollow area inside 40 with a closed top end 38 and an open bottom end 42 which can be used to house a weight, magnet, lighting, or any number of other attachments.

Figure 6:
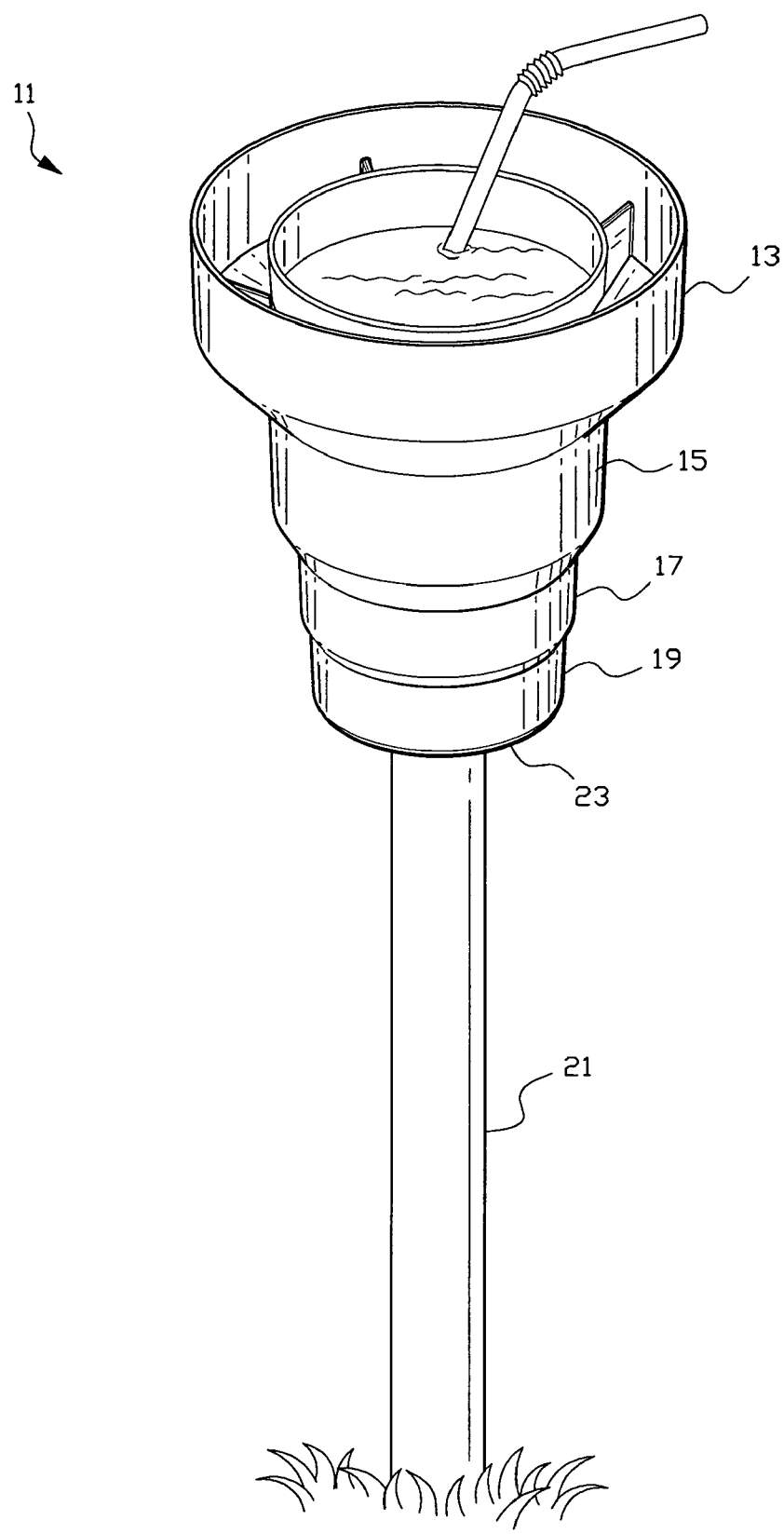
FIG. 6 is an environmental perspective view of the holder with a single pole mount.

Referring to FIG. 6, a four section cup holder 11 embodiment of the invention is shown comprising sections 13, 15, 17 and 19. A pole 21 is attached into the recessed open bottom end 23 to provide a stand-alone beverage cup holder, typically for outdoor applications.

Figure 7:
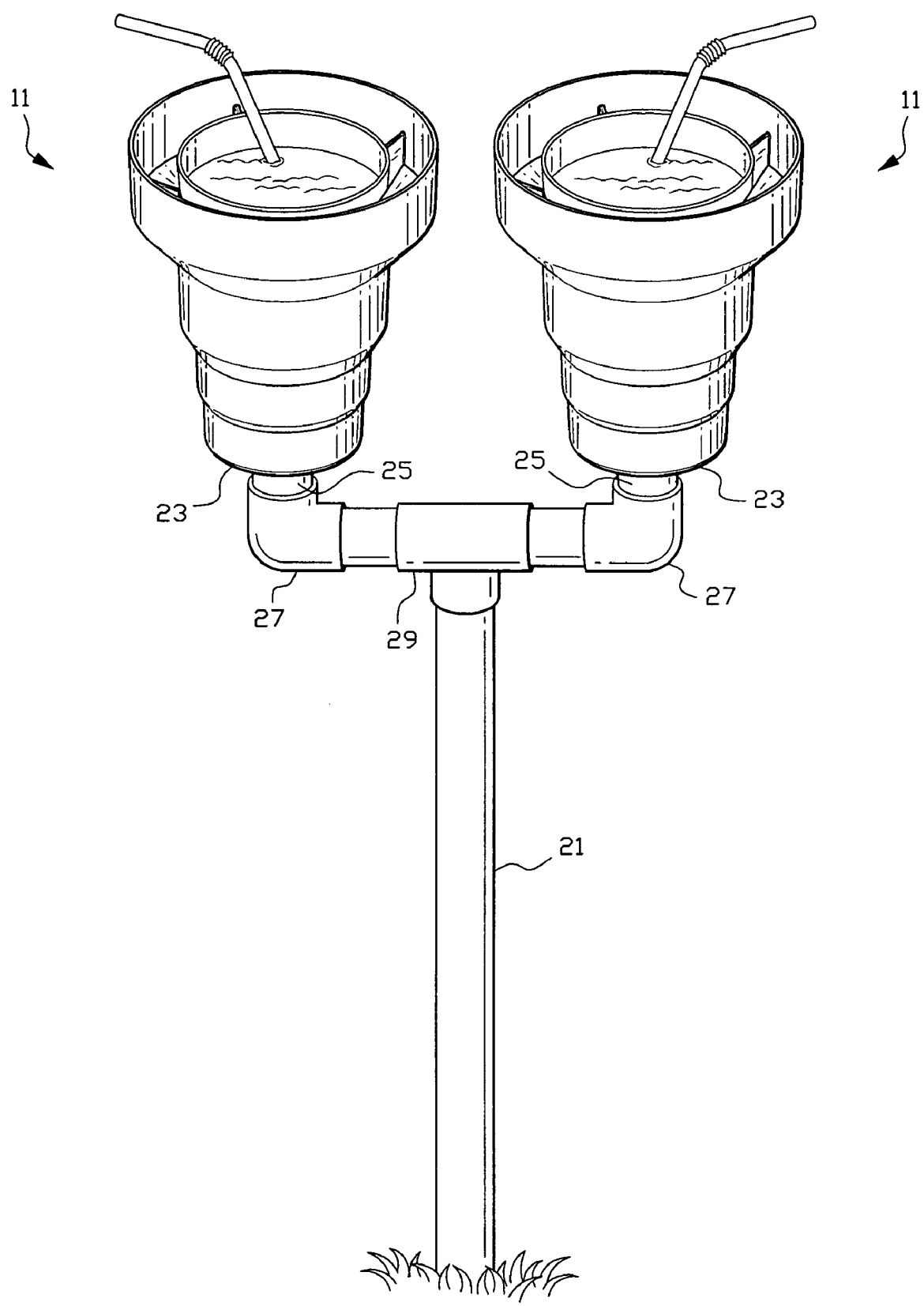
FIG. 7 is an environmental perspective view of the holder with a twin holder on a pole mount.

Referring to FIG. 7, twin four section cup holder 11 embodiments of the invention are shown. Nipples 25 have been attached in the recessed open bottom end 23 and connected through elbows 27 and tee 29 to pole 21 to provide a twin stand-alone beverage cup holder.

Figure 8:
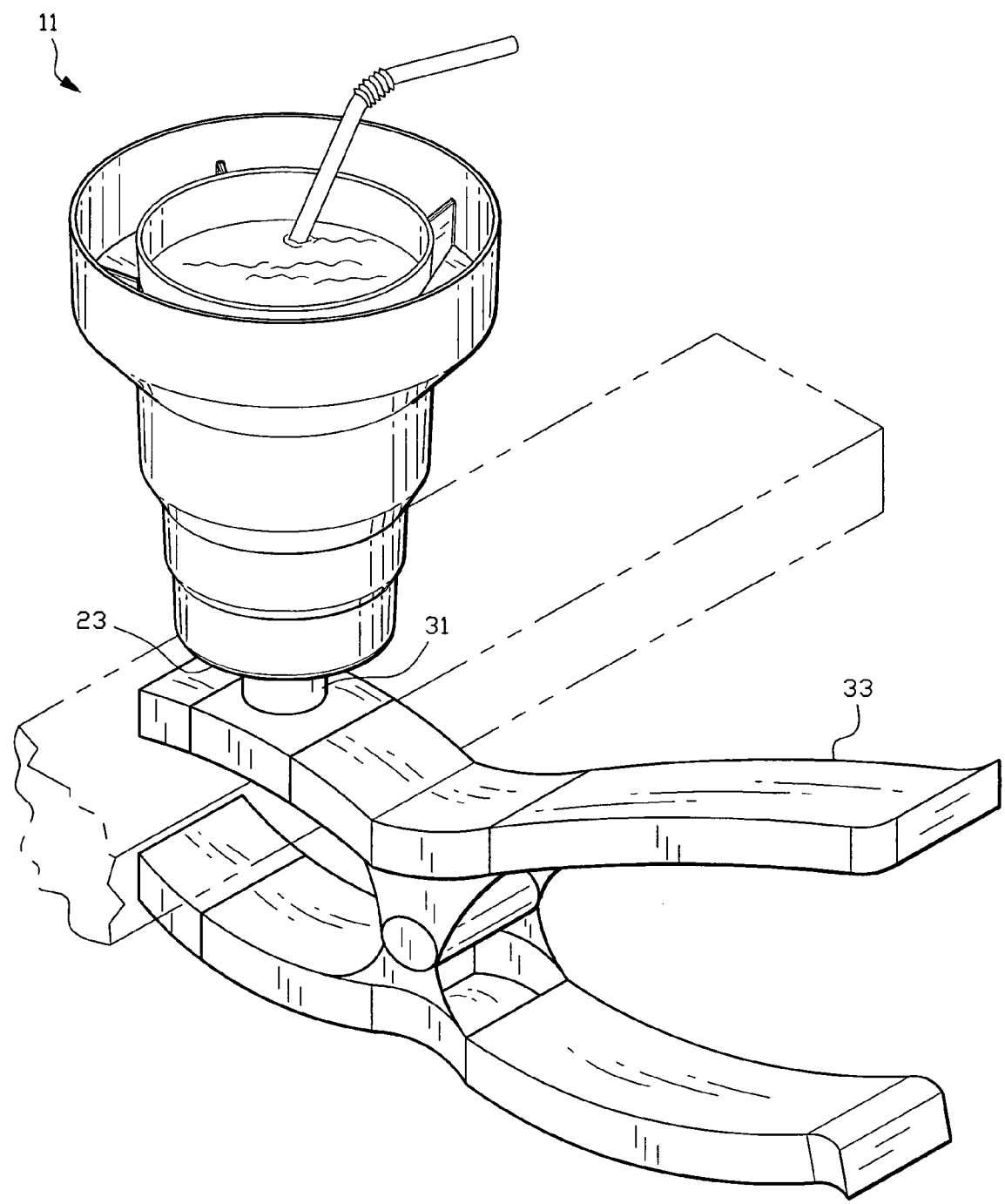
FIG. 8 is an environmental perspective view of the holder with a clamp adaptor.

Referring to FIG. 8, a four-section cup holder 11 embodiment is shown connected from recess 23 to clamp 33 at clamp-head 31. This embodiment illustrates the flexibility of the cup holder invention which, when connected to a clamp, can be moved from place to place with ease.

Figure 9:
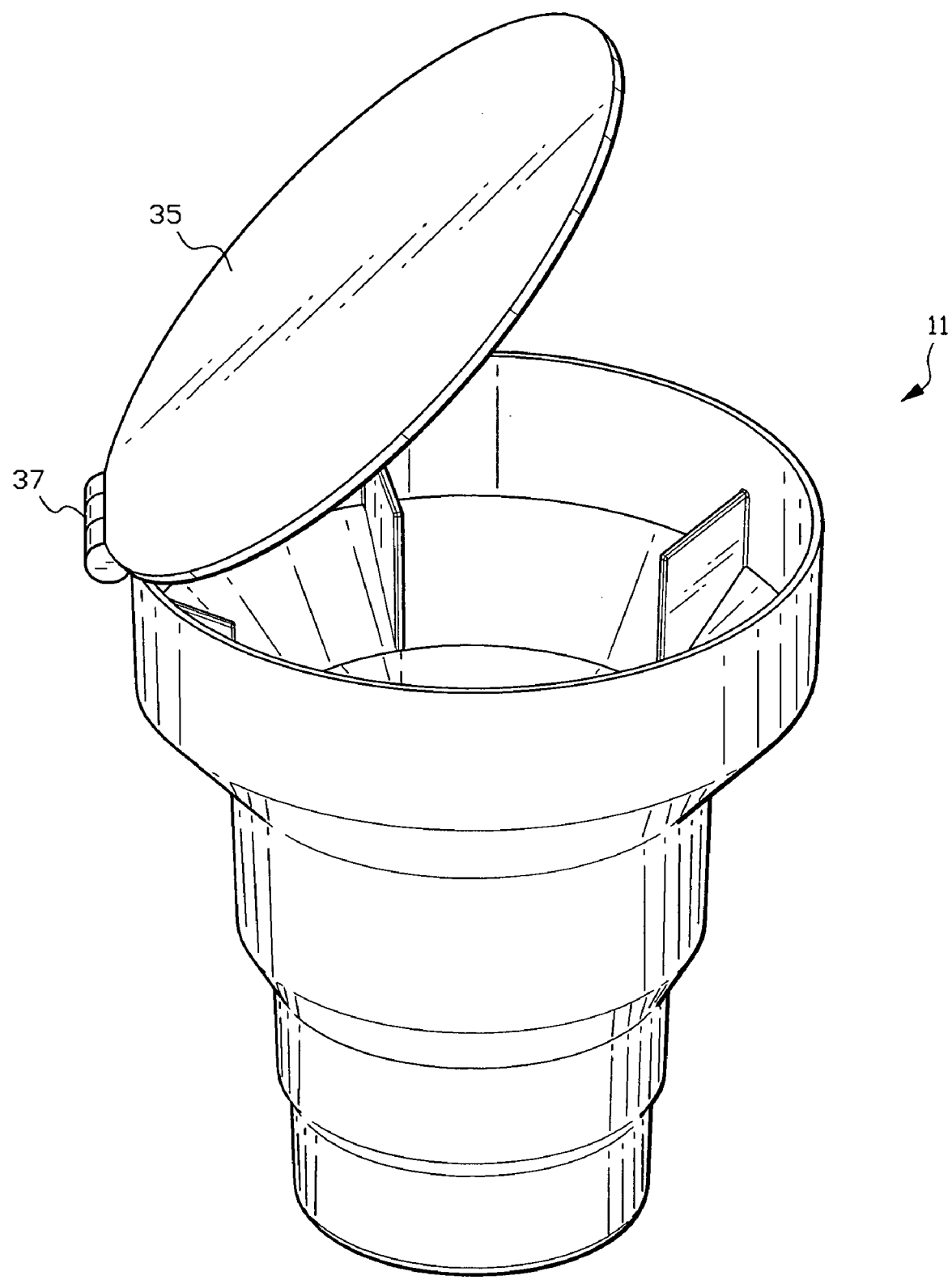
FIG. 9 is an alternate embodiment of the holder with a flip-top cover.

Referring to FIG. 9, a four-section cup holder 11 embodiment is shown with flip top 35 attached to the first section of the cup holder by a snap spring-loaded hinge 37.

Figure 10:
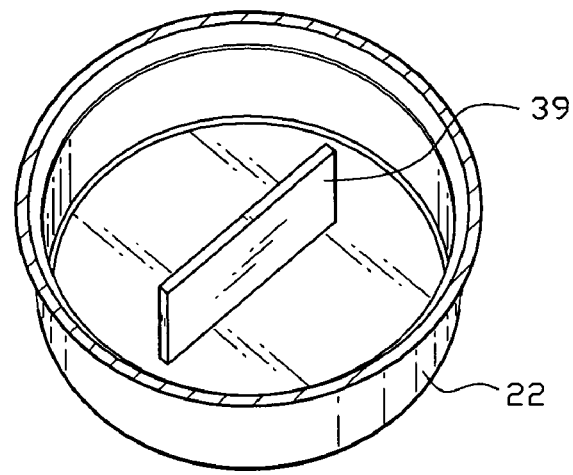
FIG. 10 is a top view perspective of the bottom of the holder.
Figure 11:
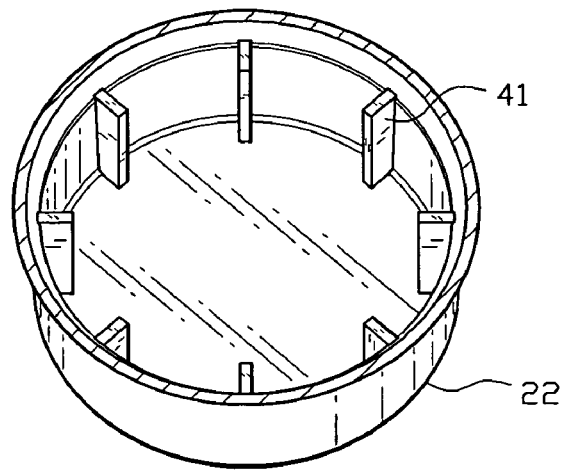
FIG. 11 is a perspective view of a third embodiment of the holder showing the bottom of the holder.
Figure 12:
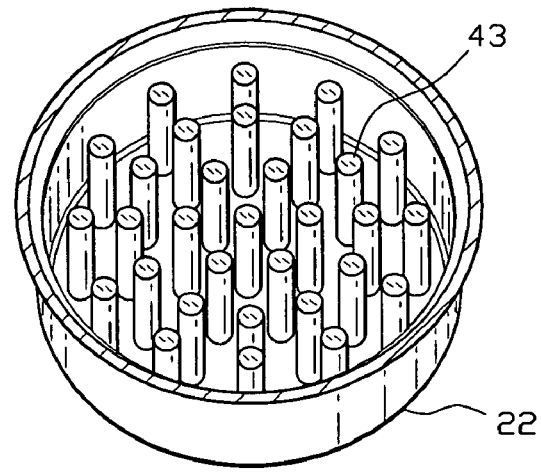
FIG. 12 is a perspective view of a fourth embodiment showing the inside bottom of the holder.

Referring to FIGS. 10, 11, and 12 alternative means are presented to support the cup bottom in the bottom section, i.e. 22 for third section and 19 for fourth section, of the cup holder. In FIG. 10 shows at least one vertical wall or strut 39 in the bottom center of the bottom section 22. The strut may extend from wall to wall or be positioned in the center. In FIG. 11, multiple indents 41 are produced in the bottom wall to support the cup bottom. In FIG. 12, multiple short vertical studs 43 are connected to the interior bottom of the holder to support the cup bottom.

Figure 13:
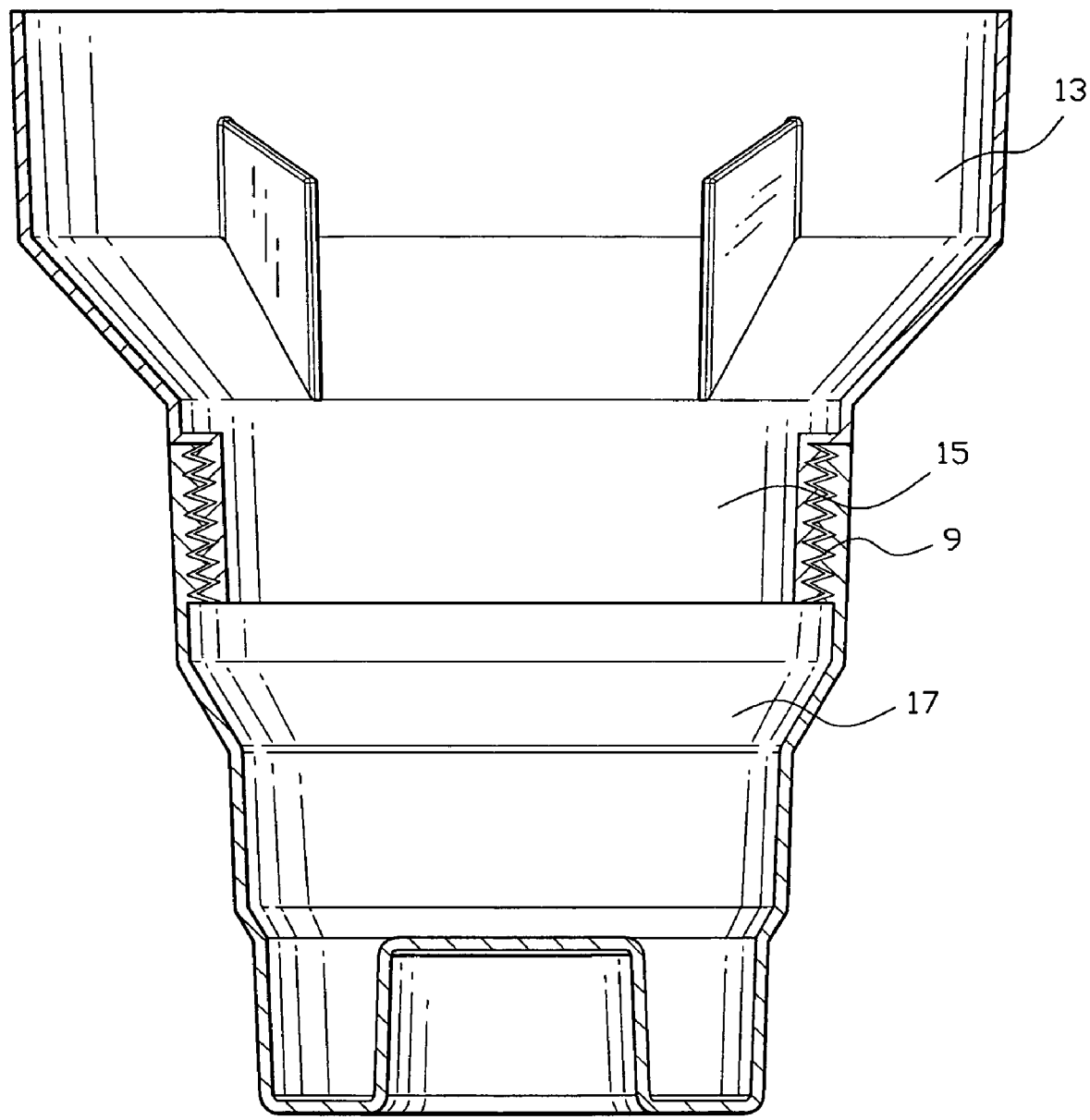
FIG. 13 is a sectional view of a holder containing a top adjustable adapter for wide diameter and taller cup applications.

Referring to FIG. 13, a multiple piece cup holder 13 is shown. The sections 15 and 17 are separable. Each section is capable of fitting together 9. Fitting the multiple pieces together to form a complete beverage cup holder combines these sections.

Figure 14:
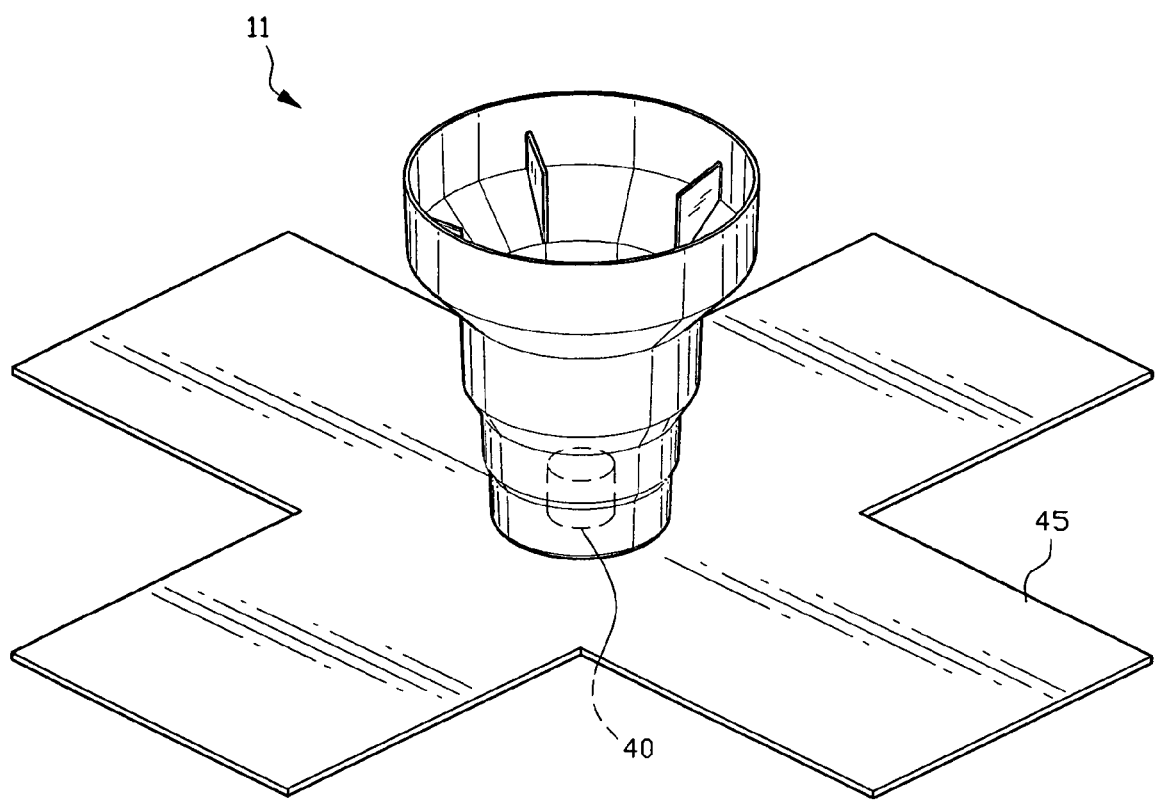
FIG. 14 is an environmental perspective view of the invention with the beverage cup holder connected to a stable platform.
Figure 15:
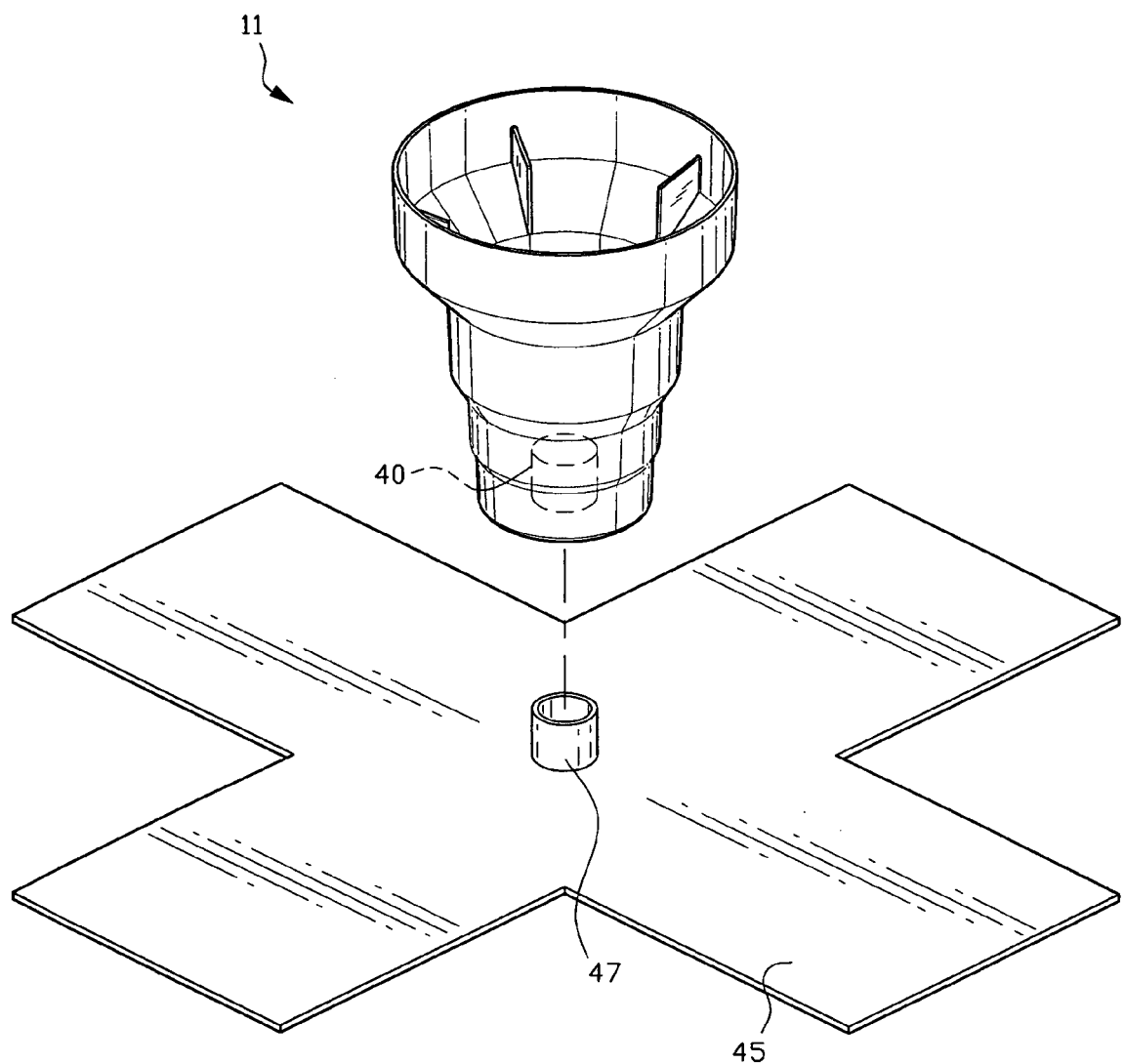
FIG. 15 is a perspective view of the beverage cup holder in position to be connected to a nipple fixed on the stabilizing platform.

Referring to FIG. 14, the beverage cup holder 11 is shown attached to a portable platform 45 that prevents the holder from being accidentally upset and spilling liquid onto a table or desk. The attachment is made by using the recessed pocket 40 at the holder bottom to connect with a nipple or other means inserted into the pocket. FIG. 15 presents another perspective view of the combination of the holder 11 being combined with a nipple 47 on a platform 45 to form a very stable structure.

Figure 16:
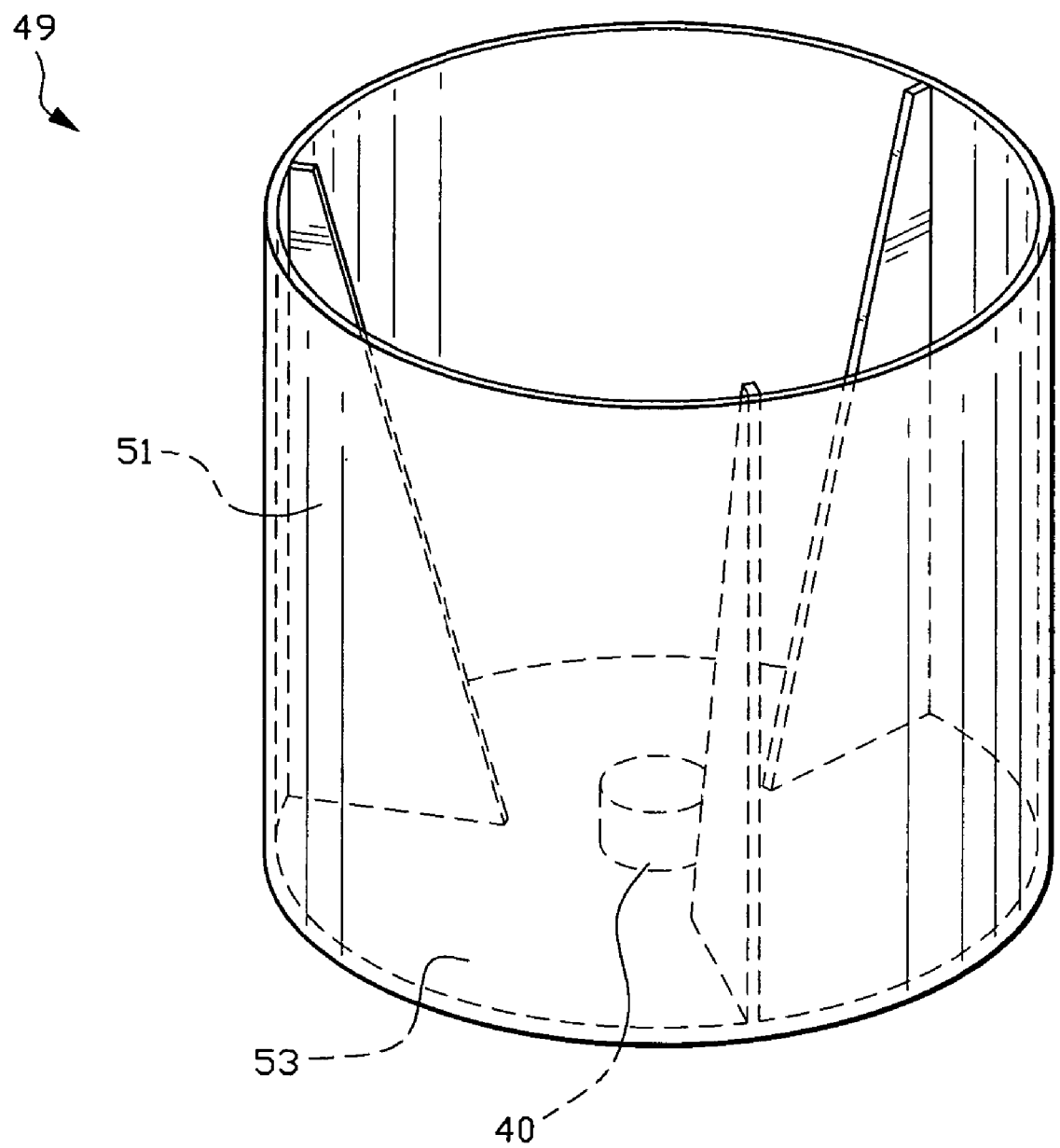
FIG. 16 is a view perspective view of a beverage cup holder of the invention comprising a single section with ribs and centered column.

FIG. 16 illustrates the application of the discoveries of the invention as applied to a beverage cup holder consisting of only one section 49. Ribs 51 are fixed inside the single section to support the beverage laterally and an elevated section in the bottom portion of the holder 40 support the bottom of the beverage cup while forming a reservoir portion 53 in the bottom of the holder.

Figure 17:
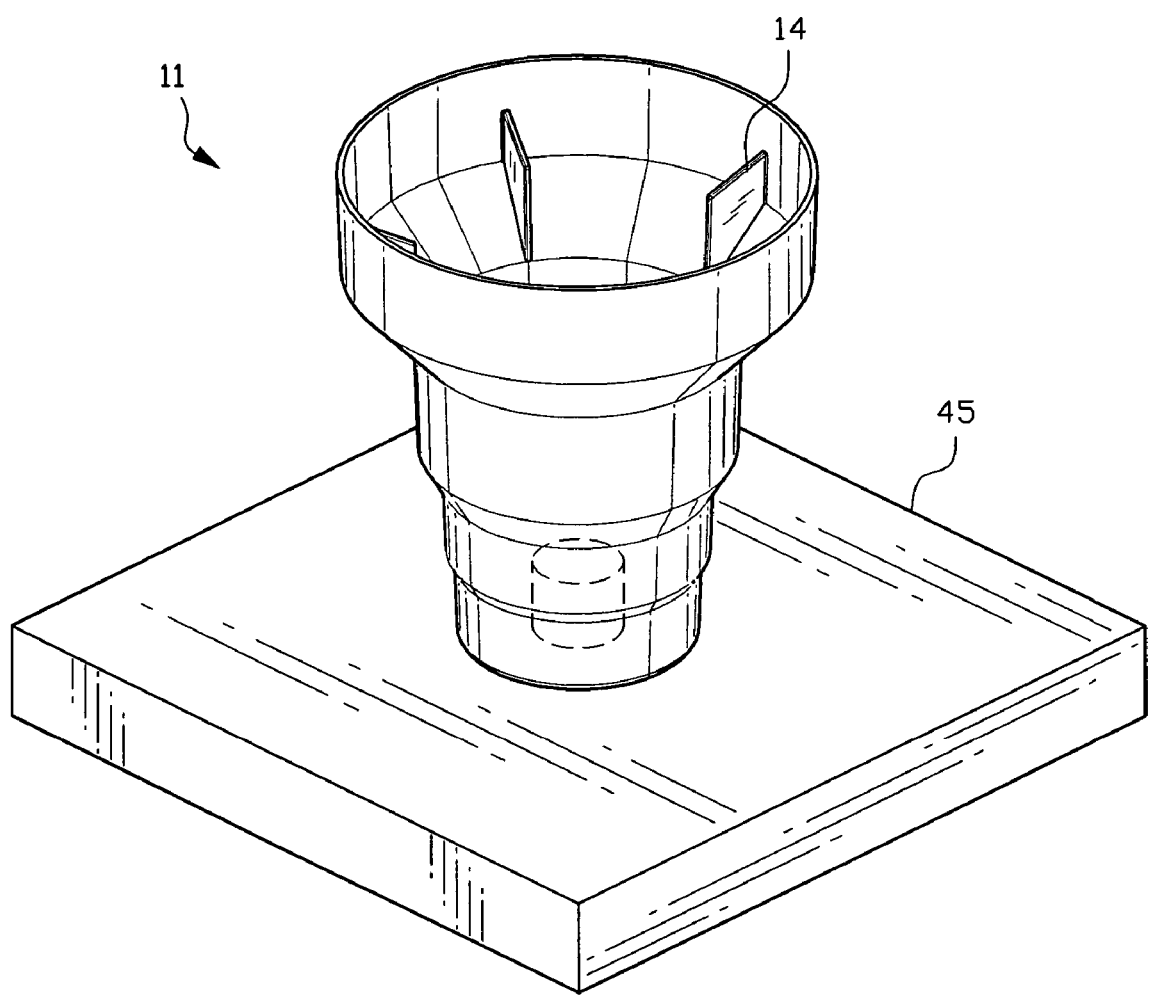
FIG. 17 is an overhead perspective view of the beverage cup holder attached to a platform.

Referring to FIG. 17, the overhead perspective view of the holder 11 shows the ribs 14 of the holder used to support the beverage cup laterally while the holder is fixed to a platform at the recessed cup 40 attachment.

Figure 18:
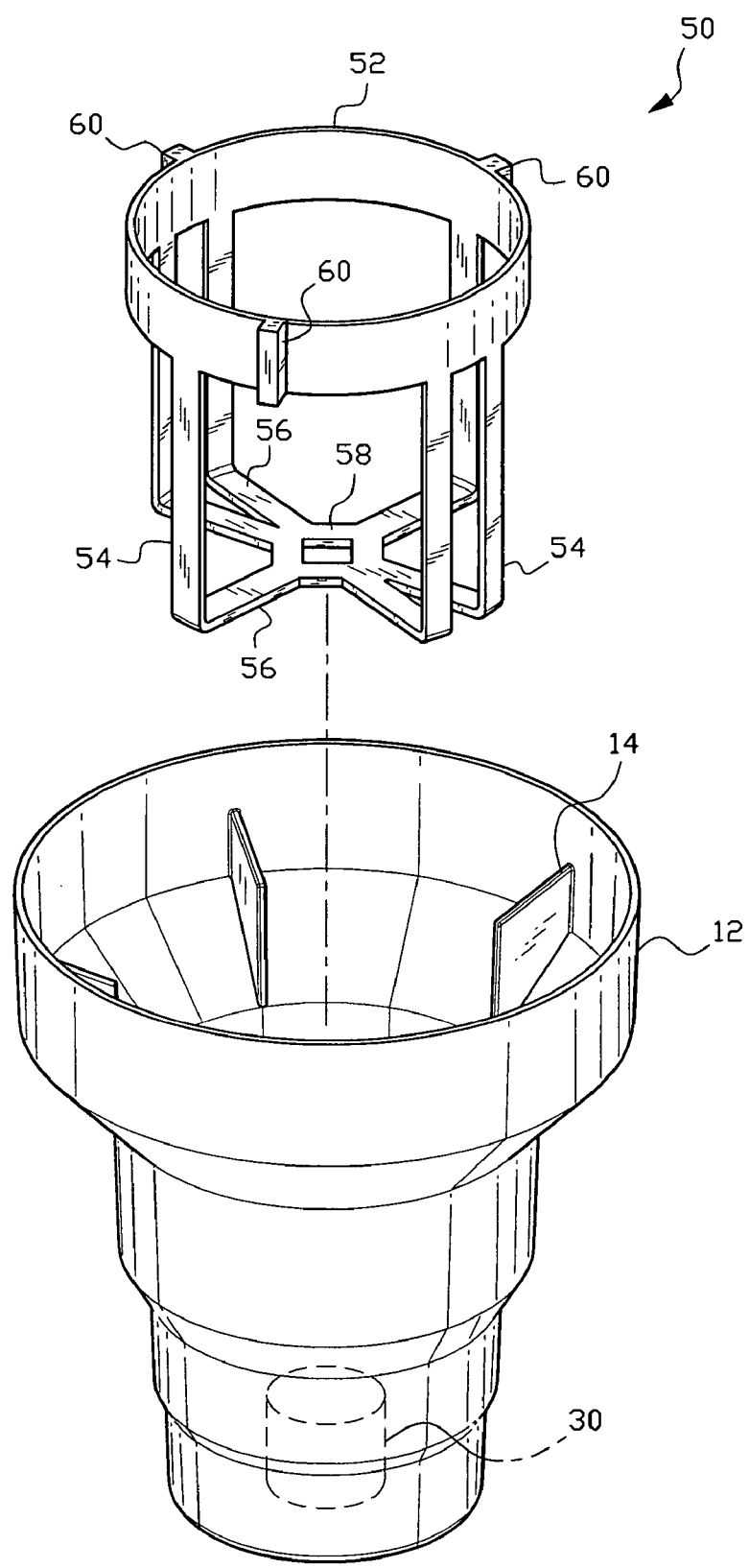
FIG. 18 is an exploded, perspective view of an embodiment incorporating a removable basket according to the present invention.
Figure 19:
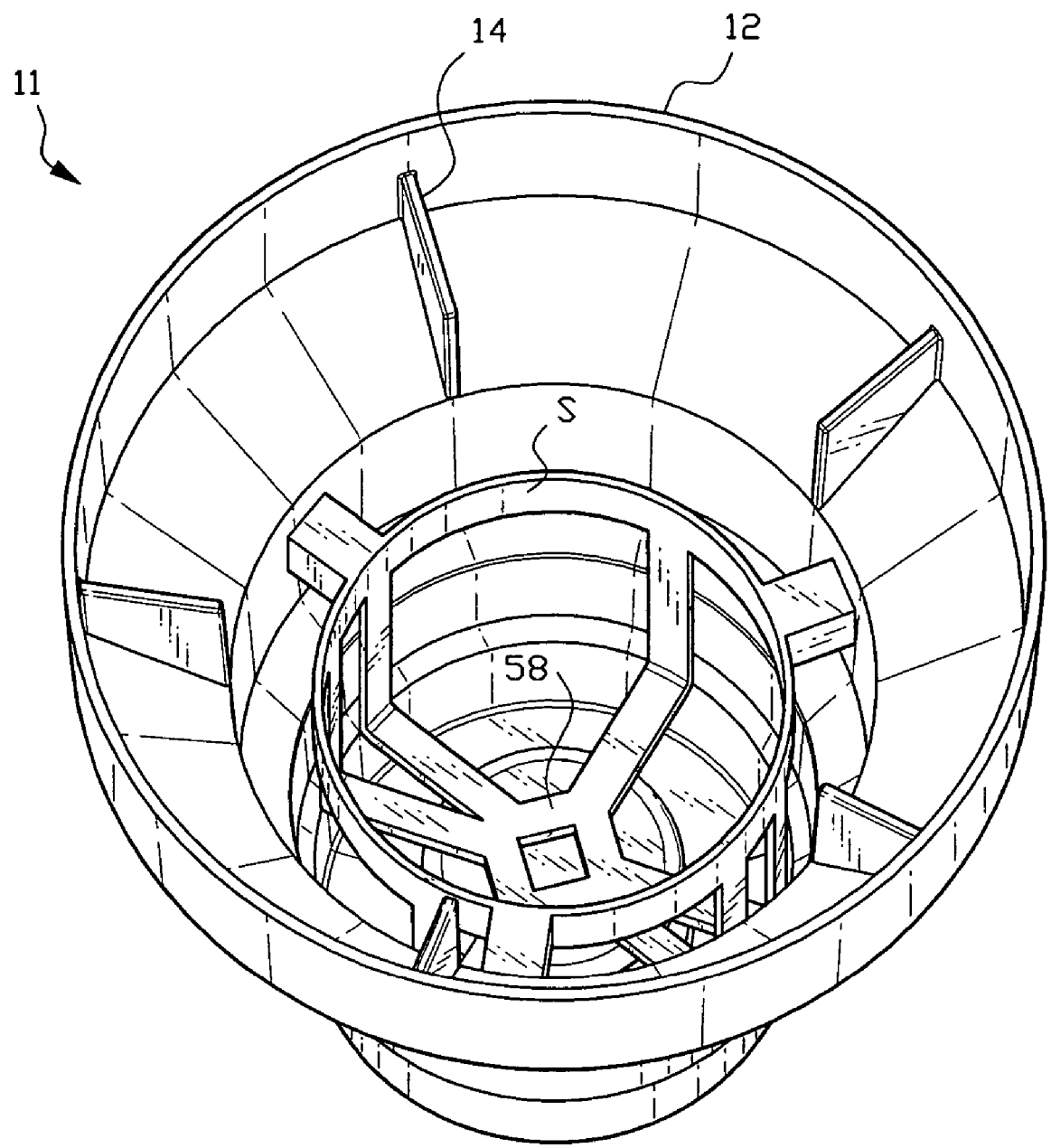
FIG. 19 is a top, perspective view showing the basket nested in the holder according to the present invention.

FIGS. 18 and 19 are illustrative of another embodiment of the invention incorporating a removable basket 50, which basket is adapted to receive the beverage container or cup. Basket 50 comprises an annular member 52 having plural, thin leg members 54 extending vertically downward therefrom. Each leg member has a foot portion 56 that extends perpendicularly to each respective leg member 54. The foot portions intersect to form a base 58. An array of ribs 60 is evenly spaced around the exterior surface of member 52. As best seen in FIG. 19, base 58 will rest atop support column 30 when the basket 50 is nested in the holder. Ribs 60 will provide for a snug fit for the basket.

Figure 20:
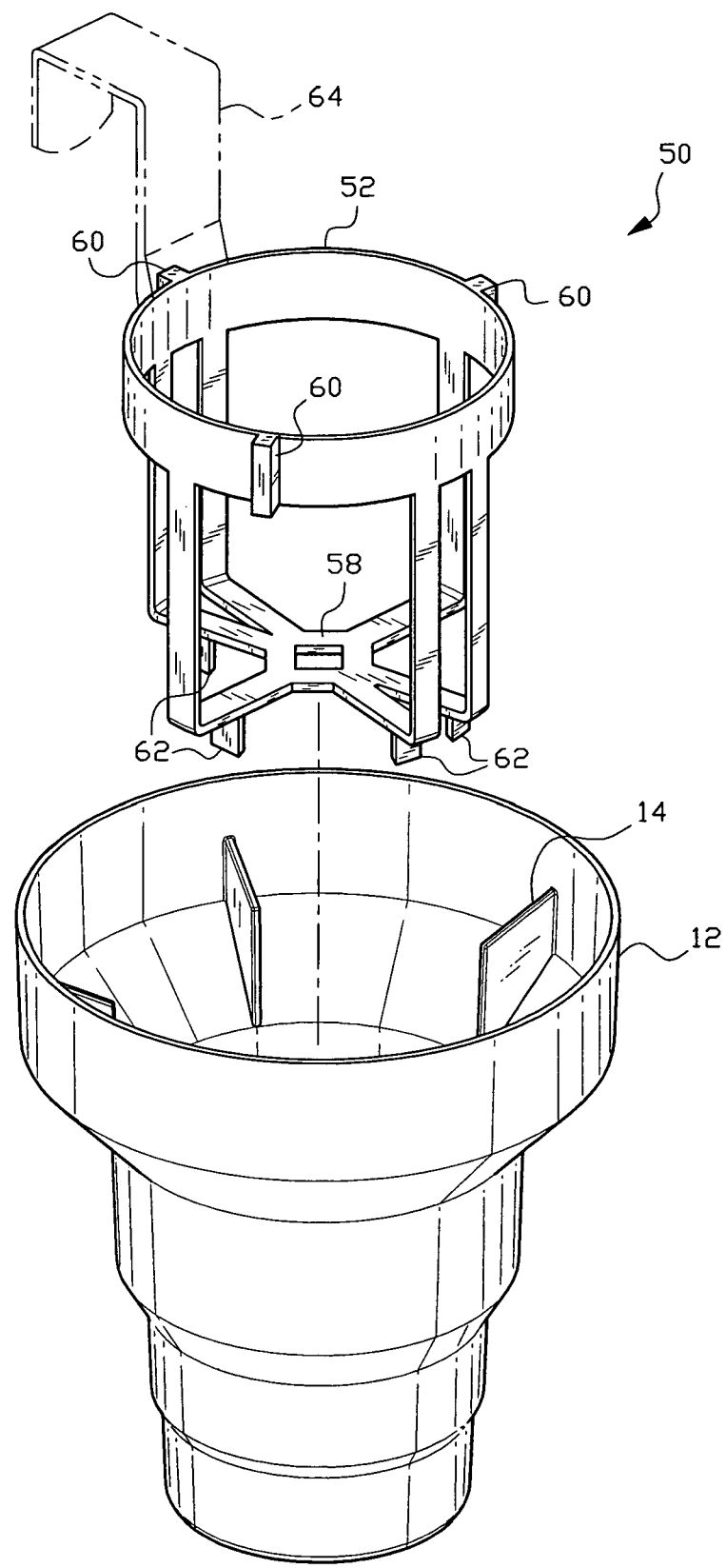
FIG. 20 is an exploded, perspective view of an embodiment showing the basket with feet according to the present invention.

As illustrated in FIG. 20 support column 30 can be eliminated and plural feet 62 can be disposed on base 58 to support the basket above the bottom of the holder. Alternatively, a handle 64 (shown in phantom lines) can be employed to hang the basket from rim 12 of the holder.

Figure 21:
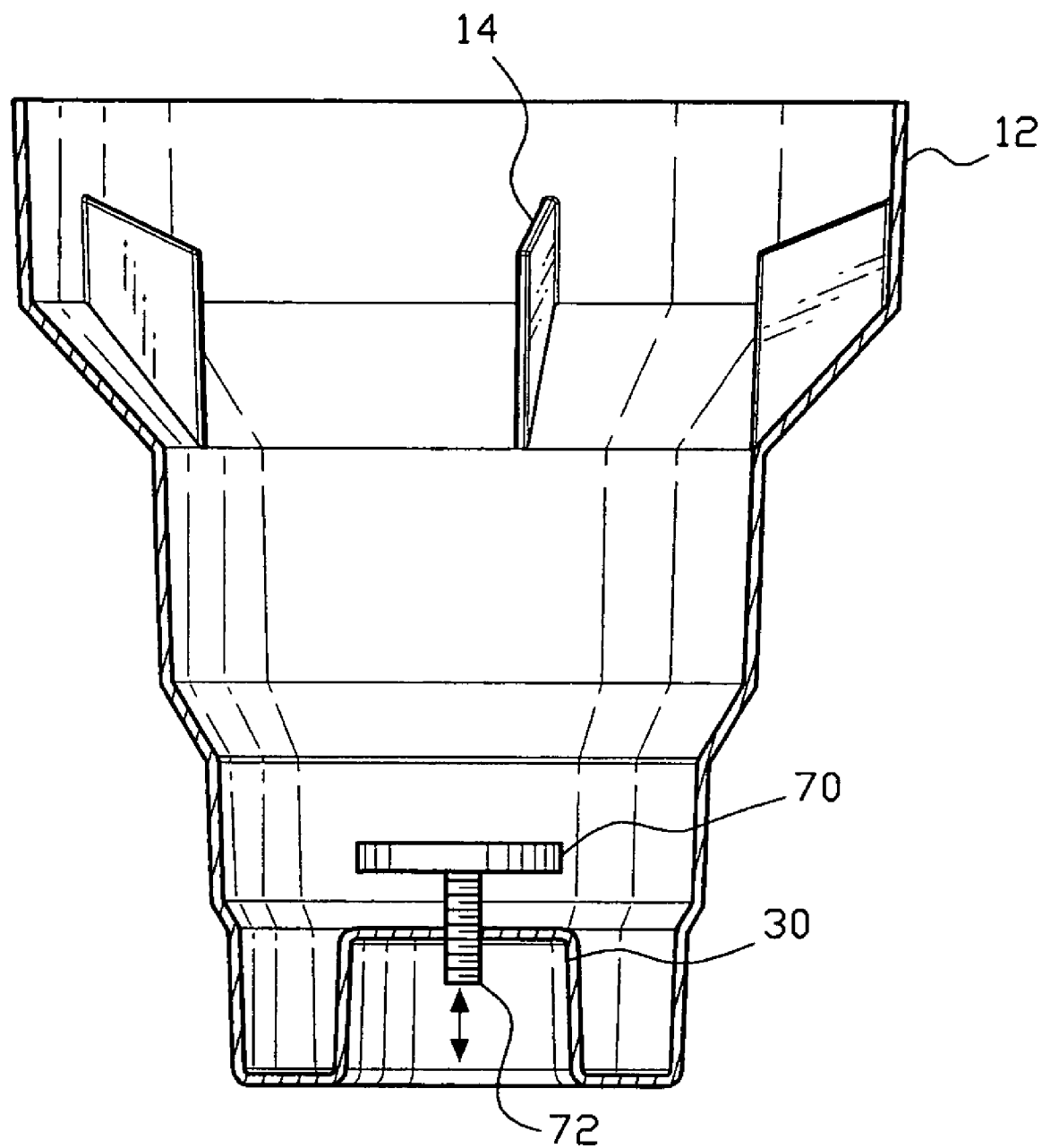
FIG. 21 is a cross-sectional view of an embodiment having an adjustable platform according to the present invention.

The embodiment of FIG. 21 employs a platform 70 positioned on support column 30. Platform 70 is mounted on an elongate threaded member 72, which threaded member is adjustably disposed in column 30. This arrangement permits vertical adjustment of shorter cups used in the holder.

Figure 22:
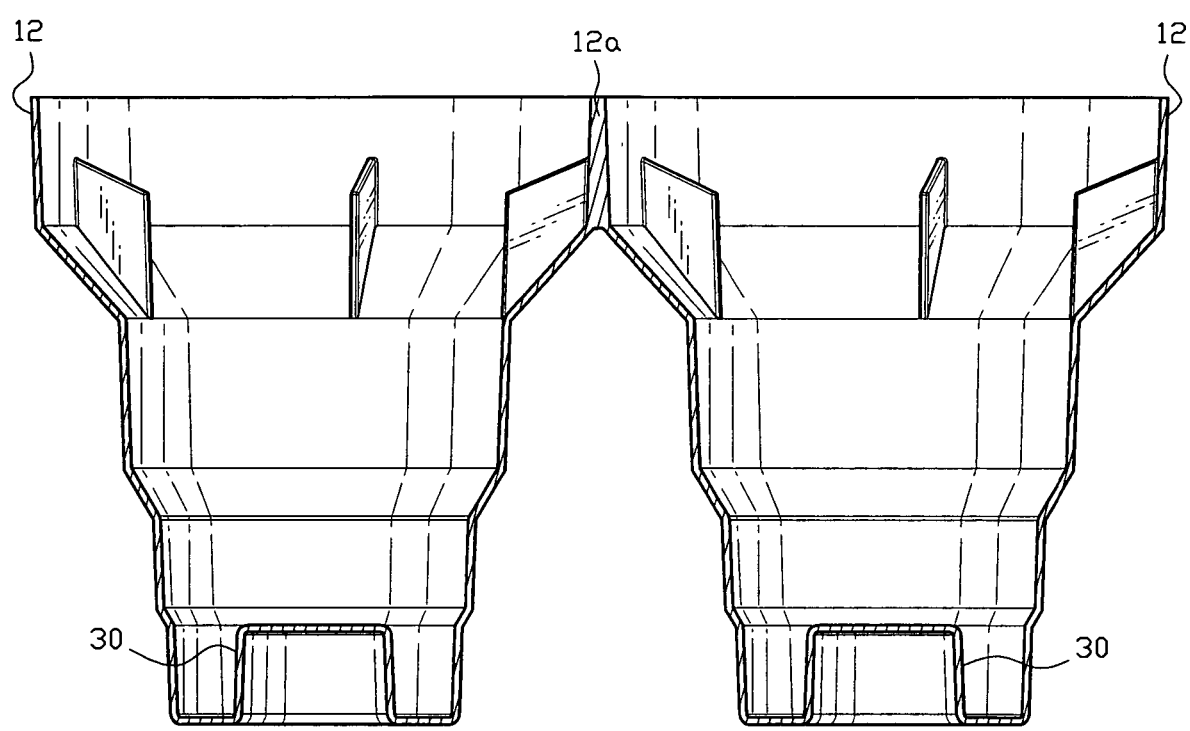
FIG. 22 is a cross-sectional view of an embodiment incorporating plural holders according to the present invention.

FIG. 22 is illustrative of an arrangement wherein plural cups may be contained. A pair of holders is joined along their circumferences at 12a to accomplish this arrangement.

It is to be understood that the present invention is not limited to the embodiments described above, but encompasses any and all embodiments within the scope of the following claims.

I claim:

1. A holder for housing a beverage cup consisting essentially of:
    a generally cylindrical one-piece container, said container being defined by a continuous, integral interior wall and an exterior wall, said container further having at least three progressively narrower sections including a first open top section, said first section including a plurality of ribs arrayed about the interior wall thereof, a narrower second middle section and a narrower third closed bottom section including an imperforate bottom wall, wherein the rim of said top section is wider and higher than the rim of said cup; and a centered portion of the bottom wall of said third section being elevated to comprise a vertical support column for the beverage cup bottom, said vertical support column being circumferentially spaced from the interior wall of the third section thereby creating a continuous annular reservoir for spilled fluids and an exterior recessed pocket below the raised column.

2. The cup holder of claim 1, wherein said ribs comprise at least three vertical, narrow, flat, horizontally opposed ribs circumferentially edge disposed about the interior wall of said first section.

3. The holder of claim 1, wherein said vertical support column for supporting the cup comprises multiple short vertical studs connected to the interior bottom of the holder to support the cup bottom.

4. The holder of claim 1, wherein said vertical support column for supporting the cup comprises multiple interior indentations around the bottom section of the cup holder.

5. The holder of claim 1, further having a flip top lid attached to said rim.

6. The holder of claim 1, wherein said vertical support column for supporting the cup includes a strut installed lengthwise across the bottom section of the holder.

7. The holder of claim 1, wherein the exterior recessed pocket is connected to a portable platform.

8. The holder of claim 7, wherein the recessed pocket is connected to the portable platform by a nipple attached to the platform and inserted in the pocket.

9. A holder for housing a beverage cup consisting essentially of:
    a generally cylindrical one-piece container, said container being defined by a continuous, integral interior wall and an exterior wall, said container further having a plurality of progressively narrower sections including a first open top section, said first section having a diameter sufficient to accept the receipt of the beverage cup adapted to be retained in the holder, a narrower second section, said second section having a closed bottom section including an imperforate bottom wall at a lowermost portion of the container; and a centered portion of the bottom wall of said second section being elevated to comprise a vertical support column for the beverage cup bottom, said vertical support column being circumferentially spaced from an interior wall of the second section thereby creating a continuous annular reservoir for spilled fluids.

10. The holder of claim 9, wherein said first section includes means for supporting a beverage cup within the holder.

11. The holder of claim 10, wherein said supporting means include a plurality of spaced apart ribs arrayed about the interior wall of the holder.

12. The holder of claim 9, wherein said elevated vertical support column defines an exterior recessed pocket below said column.

13. The holder of claim 12, further including means for supporting said holder vertically from a support surface, wherein said means engages said exterior recessed pocket.

14. The holder of claim 13, wherein said support means further including means for supporting a pair of cup holders.

15. The holder of claim 13, wherein said support means further includes a clamp.

16. The holder for housing a beverage cup as recited in claim 1, further including, an elongate member adjustably threaded in said column and a platform mounted to said elongate member.

17. The holder for housing a beverage cup as recited in claim 9, further including, a cup retaining basket structure removably positioned in said generally cylindrical container, said cup retaining basket structure having a base, wherein said base is disposed on said column.

18. The holder for housing a beverage cup as recited in claim 9, further including, a cup retaining basket structure removably positioned in said generally cylindrical container, said cup retaining basket structure having a base, wherein said base is disposed on said column, said cup retaining basket structure comprises;
  an annular member;
  a plurality of thin leg members attached to said annular member and extending vertically downward therefrom;
  a respective foot member extending perpendicularly from each respective thin leg member, wherein the respective foot members intersect to form said base.

19. The holder for housing a beverage cup as recited in claim 9, further including, a cup retaining basket structure removably positioned in said generally cylindrical container, said cup retaining basket structure having a base, wherein said base is disposed on said column, and said cup retaining basket structure comprises;
  an annular member, said annular member having an exterior surface;
  a plurality of thin leg members attached to said annular member and extending vertically downward therefrom;
  a respective foot member extending perpendicularly from each respective thin leg member, wherein the respective foot members intersect to form said base; and
  an array of rib members evenly spaced around said exterior surface of said annular member.

* * * * *